March 17, 1925.  1,530,133

G. S. MAXWELL

GRENADE AND METHOD OF CREATING PRESSURE THEREIN

Filed April 23, 1923

Inventor

George S. Maxwell,

By

Attorney

Patented Mar. 17, 1925.

1,530,133

UNITED STATES PATENT OFFICE.

GEORGE S. MAXWELL, OF WASHINGTON, DISTRICT OF COLUMBIA.

GRENADE AND METHOD OF CREATING PRESSURE THEREIN.

Application filed April 23, 1923. Serial No. 634,075.

*To all whom it may concern:*

Be it known that I, GEORGE S. MAXWELL, a citizen of the United States, residing at Washington, in the District of Columbia, have invented certain new and useful Improvements in Grenades and Methods of Creating Pressure Therein; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to containers or grenades containing a liquid to be ejected by pressure produced within the container. It has for its objects, primarily, the creation of pressure in a container within limits of safety by ignition of a gas producing substance in the container; and further the ejection of a liquid from a container by pressure produced by gas generated in the container by an ignitable gas producing substance ignited in the container so as to create sufficient pressure within the container for ejection of its contents without rupturing or shattering the container. Also to provide features in a container or hand-grenade which will contribute to the life of the container without the necessity of replacement of parts after a comparatively protracted storage of the grenades, and by which safety in the use of the containers will be insured and their efficiency and scope of operation will be increased.

To the accomplishment of the foregoing and such other objects as may hereinafter appear the invention consists in the method and in the means hereinafter particularly described and then sought to be clearly defined by the claims, reference being had to the accompanying drawing forming a part hereof, and in which—

Figure 4:
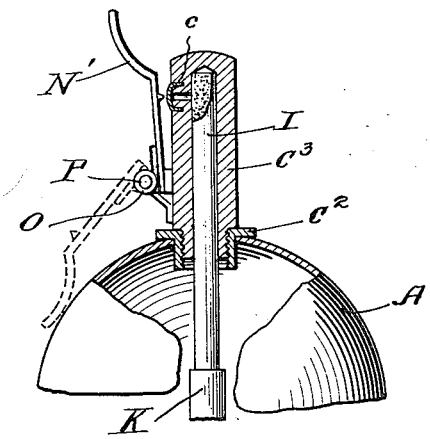
Figure 4 is a partial view of a grenade, partly in section, showing a modified method of constructing the firing mechanism of a grenade.

I am aware that devices for atomizing or spraying liquids, paint, cement and other fluid or semi-fluid substances by means of compressed air have been devised. In these, however, the compressed air is contained in a vessel or container that is separate from the vessel containing the liquid that is to be sprayed or atomized, the compressed air being carried from its container to the liquid container by means of suitable piping and valves.

I am also aware that fire extinguishers are made in which carbon dioxide gas is generated in the body of the extinguisher by a mixture of an acid and an alkaline carbonate in the presence of water, and the gas pressure generated by the chemical reaction of the acid and alkaline carbonate in the presence of water is used to force the water containing carbon dioxide in solution from the ejecting nozzle of the fire extinguisher.

I am not aware, however, that means for creating a safe predetermined pressure within a container by means of an ignitable gas producing compound have heretofore been devised or constructed. Nor am I aware that pressures so generated have been used for any purpose or to produce any useful results.

In hand grenades, as at present constructed, the contents are set free or scattered by means of a bursting charge that is of sufficient strength to completely shatter the walls of the grenade and atomize or vaporize the liquid charge of gas or other material contained in the grenade. Grenades of the explosive type do not deliver the full efficiency of the contained liquid charge, as a large portion of the liquid is chemically changed by the high temperature generated by the bursting charge. A large portion of the liquid charge is also driven into the ground or surrounding objects by the violence of the explosion. They are unsuited for peace time uses, for the capture of barricated criminals, the suppression of riots, the control of mobs, etc., where humanitarian reasons require the accomplishment of the object desired without danger of mutilation or death.

The grenades, as at present constructed, are also unsatisfactory owing to the spring which operates the firing mechanism being held constantly under tension with the result that about 60 per cent of the grenades in storage for one year will not fire the primer and have to be reconditioned. They are dangerous to load with the primer detonator or bursting charge. In some types of grenades the fuse is ignited while still in the hand of the user. This type of grenade is especially dangerous, owing to the fact that a squib fuse may cause a premature ignition of the bursting charge and result in the explosion of the grenade before the user has time to throw it after starting the burning of the fuse. In addition to the above objectionable features must be added the danger of fire when grenades with bursting charges are thrown into buildings or amongst combustible matter.

In the grenade which I have invented, the above objections have been overcome in an extremely simple and efficient manner. There is no danger of mutilation or death from flying fragments. There is no danger of starting a fire. The full efficiency of the liquid charge of the grenade is secured as none of it is altered by a high temperature of explosion, nor driven into the ground or surrounding objects by a violent explosion. Consequently there is no danger to the user of the grenade. It is safe to load or store, as the primer cap is not assembled with the fuse until the grenade is to be put into use. Its striker spring cannot lose its resiliency and become set, as it is never under compression until the grenade is put into use.

The above desirable features in a hand grenade are obtained in my invention by causing a safe increase in the pressure in the interior of the grenade by means of a gas generating compound that is capable of being ignited or set in operation by means of a primer cap and fuse; the increase in pressure in the interior of the grenade acting on its liquid charge forces the liquid charge through an atomizing or spraying tube into the outside surrounding air. By "safe" increase in pressure is meant a non-explosive pressure such as will not disrupt and shatter the grenade by the force of explosion within the grenade. By creating a pressure within limits sufficient to eject the contents without shattering the grenade by a forcible explosion within the grenade a very material degree of safety as well as other advantages enumerated is provided. The efficiency of the distribution of the ejected sprayed or atomized liquid charge is largely increased by the novel method of constructing the body of the grenade with a weighted bottom and discharging the liquid charge from the top of the grenade. The result of this method of construction is that the ejected liquid charge collides against the surrounding air and the resultant reaction causes the grenade to wobble, rock or rotate in a manner that is dependent on the angle at which the atomizing or ejecting nozzle is assembled with relation to the body of the grenade. This rotation or rocking of the grenade causes the ejected liquid charge to be distributed over a wider area than is possible with a grenade of the explosive type, and insures the full efficiency of the grenade.

In operation the grenade is gripped in the hand in the same manner as a ball about to be thrown, the striker of the grenade is cocked and held in that position by the thumb of the holding hand, the safety pin of the grenade is then withdrawn by the free hand when the grenade is ready to be thrown. The instant the grenade leaves the hand the striker being released from the pressure of the thumb of the throwing hand, is instantly snapped against the grenade primer by its actuating spring and causes the primer to detonate and ignite a time fuse of approximately five seconds burning time to allow time for the grenade to reach its target before expelling its liquid charge. When the burning of the time fuse reaches the gas producing agent it ignites it with the result that a large volume of gas is instantly generated, the internal pressure inside the grenade is raised and as a result of the rise in pressure the liquid charge in the grenade is forced out of the grenade by the atomizing or ejecting nozzle.

With the ordinary type of grenade it is absolutely necessary that the user throw it to a distance in order to avoid injury from flying fragments when the grenade is exploded by its bursting charge. With my invention it is not necessary to throw the grenade unless it is so desired in order to reach distant targets. In ordinary cases where an officer of the law is close to an offender or where it is desired to overcome a riot or mob, or to drive a hidden criminal from his shelter, the grenade covered by my invention may safely be held in the hand of the officer and the liquid contents of the grenade sprayed in any desired direction, or through any crack or opening into a criminal's place of concealment. Accordingly, the grenade may be correctly defined as a pistol hand-grenade.

Figure 1:
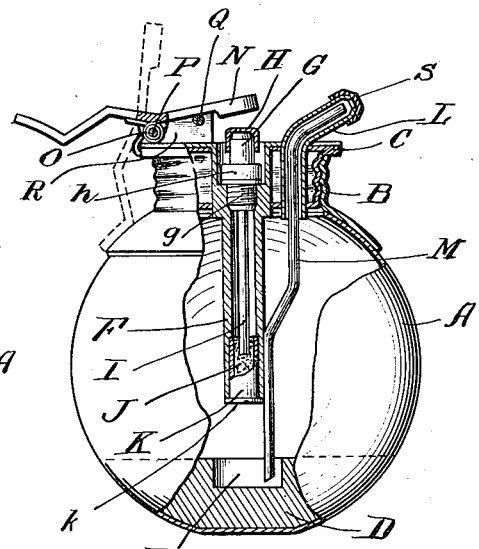
Figure 1 is a side elevation of a grenade, partly in section.

In Figure 1, A is the body of a grenade. B a threaded throat or nipple attached to or integral with the grenade body. C is a screw cap for closing the opening into the body of the grenade. D is an anchor weight formed or firmly fastened in the bottom of the grenade body for the purpose of holding the grenade in an erect position. E is a well or sump to collect the last portions of the liquid charge and insure the complete ejection of all the liquid charge. F is a booster tube or sheath for housing the time fuse and gas generating compound. G is a nipple for supporting the fuse igniting percussion cap or primer, the lower end of which may be threaded at *g* to screw into the booster F and which may have the angular shaped shoulder *h* for screwing the nipple in place. H is a percussion cap or primer for igniting the time fuse when it is struck by the striker N. I is a time fuse positioned within the booster and fitting into the nipple G to be reached by the flame from the percussion cap so that it may be ignited therefrom, and it may be cemented in the nipple so as not to accidentally drop from position. J is an ignitable gas generating compound consisting of a suitable gas producing mixture selected as judgment may dictate based upon the knowledge and skill of the person skilled in the art and the requirements desired, and designed to be ignited from the fuse I. K is a shell or cartridge case for the reception of the gas generating compound positioned within the booster and held therein by friction or a suitable cement and which may have a flange *k* to bear against the end of the booster and forming a closure to the otherwise open end of the booster to prevent liquid contents of the grenade contacting with the ignitable compound or the fuse. Whatever be the form of the closure to the end of the booster it will be ruptured or opened by the generated gas so that the gas may escape into the body of the grenade containing the agent to be ejected. L is an air pipe of an atomizing nozzle. M is a liquid conveying pipe to the atomizer nozzle. N is a striker or hammer for firing the percussion cap or primer H. O is a coiled compression spring for actuating the striker or hammer. This spring is so applied that normally it is practically free from compression strains so that the spring is not weakened and deteriorated by constant compression strains and is only put under compression or active tension by retraction of the hammer when and as the grenade is to be used. This results in great economy as it obviates the necessity of repairs and replacements to insure certainty and accuracy of operation when grenades are in storage for a relatively long period of time. P is a pivot pin upon which the striker or hammer is pivotally mounted. Q is a safety pin to hold the striker or hammer out of contact with the percussion cap or primer when the grenade is not ready to be thrown. R is a bracket, frame or support on which the striker N, its actuating spring O, and the pivot pin P are mounted. It also serves as bearings for the safety pin Q.

Figure 2:
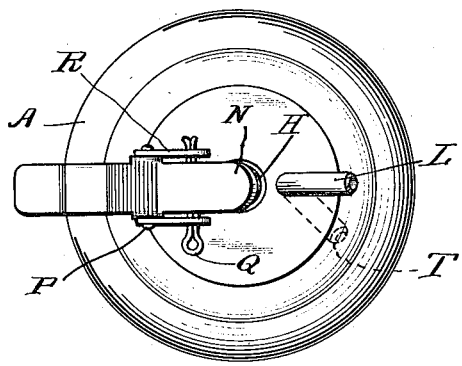
Figure 2 is a top plan view of the grenade shown in Figure 1.

In Figure 2, the dotted lines T show the atomizing nozzle set at an angle so as to produce a rotary or whirling motion of the grenade during the ejection of its liquid charge. This is of advantage as it spreads or disseminates the atomized substance over a greater area in different directions; and if the grenade be weighted as mentioned the weight tends to restore the grenade to an upright position and this together with the stated whirling movement causes the contents to be projected upwardly and downwardly as well as laterally.

Figure 3:
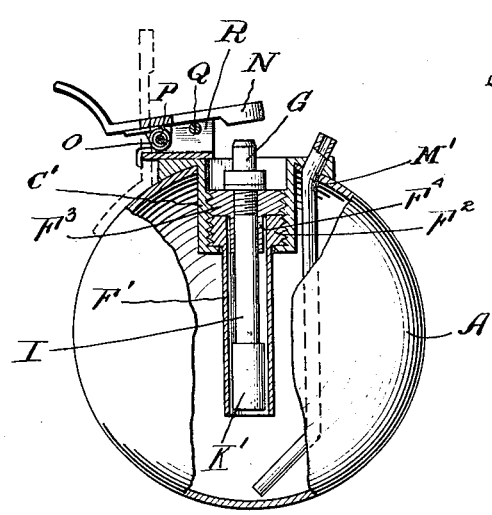
Figure 3 is a side elevation of a grenade, partly in section, showing a modified method of constructing the grenade.

In the modification illustrated in Figure 3, the body A of the grenade has a cap or cup C¹ made integral with or brazed or otherwise made practically integral with the body and extending within the body as illustrated. This cap or cup supports the booster tube F' which has a threaded enlargement or head F² so that it can be screwed into the cap. Above the head F² is a member F³ which may be threaded into cup C' and formed with a depending sleeve or collar F⁴ into which the fuse I will fit and be attached by a suitable cement or otherwise therein. Into the member F⁴ there is screwed the primer-nipple G with the upper end of the fuse I next thereto to receive the flame from the percussion cap. To the lower end of the fuse is suitably attached the cartridge K¹ that will contain the ignitable gas generating compound. The cartridge may be formed without the flange shown in Figure 1, and the fuse and cartridge may be coated with a suitable liquid resisting composition so as to protect the cartridge and fuse from the action of the liquid contained in the grenade. The grenade will be provided with a striker or hammer N and co-operating parts as in Figure 1, and may have a plain ordinary type of ejecting nozzle M¹ as illustrated. In this form of grenade, the cartridge and fuse are assembled with the primer-nipple and member carrying the fuse sleeve and then the parts screwed into the cup C' to the position illustrated in Figure 3. By removing the primer-nipple and member carrying the fuse sleeve or collar another cartridge and fuse may be installed to take the place of the first installation.

In Figure 4 I have illustrated another form of grenade in which a longer time fuse may be used and in which the primer operating devices are disposed vertically instead of horizontally as in the other forms. In this form the grenade body A has a collar or sleeve C² brazed or otherwise attached to it and into this is screwed a tubular member or booster tube C³ which receives and houses the fuse I which has attached to its lower end the cartridge K which contains the gas generating compound. The upper end of the fuse containing member C³ has a cavity *c* for receiving the fuse igniting percussion cap or primer. The striker or hammer N' is pivoted by the pintle P to a suitable bracket and is under the influence of the spring O the same as in the other forms, the hammer being arranged vertically but operating substantially as in the other forms. The fuse and the cartridge will be coated with a suitable liquid resisting cement so as not to be affected by the liquid contents of the grenade. The ejector nozzle is not shown in this form but it will be understood that it may be equipped with a nozzle, for instance, of the type illustrated in Figure 3 of the drawing, or otherwise as desired. This form provides for a longer time fuse than is illustrated in the other forms. In operation it is substantially the same as the other forms which illustrate the preferred forms. The ejection nozzle of the container will be provided with a suitable closure, for instance, an elastic cap S, or other form of closure, to prevent leakage or wastage of the liquid contents of the container. This closure will be broken or removed by the pressure created in the container so that the contents may be expelled.

I have illustrated and described with particularity the preferred details of the several parts but changes can be made without departing from some of the material features, and it will also be understood that the form of embodiment of the invention may be changed and essential features of the invention retained.

Having described my invention and set forth its merits what I claim is:

1. The method of producing a non-explosive created gas pressure in a container for ejecting a liquid or mobile agent from the container, consisting in placing within the container an ignitable substance possessing properties to generate a non-explosive created gas pressure sufficient to expel contents of the container without rupturing the container, and igniting the substance within the container to generate the expelling gas.

2. The method of forcibly ejecting liquid contents of a container, consisting in placing within the container holding the liquid, an ignitable substance possessing properties to generate a gas pressure sufficient to eject contents of the container without rupturing the container, and igniting the substance at a predetermined period of time to generate the expelling gas.

3. A container charged with a liquid, and self contained means for imparting an oscillatory movement to the container.

4. A container charged with a liquid and a gas generating substance by means of which the liquid may be forcibly ejected from the container, and self contained means for imparting an oscillatory movement to the container in ejection of its contents.

5. A hand-grenade to receive a liquid and containing a gaseous substance adapted upon ignition to generate a gas pressure sufficient to eject the liquid without disrupting the container, a firing mechanism including a hammer, and actuating spring, the spring being normally free from a load and placed under tension only when the hammer is manipulated for action.

6. A hand-grenade to receive a liquid and containing a gaseous substance adapted upon ignition to generate a gas pressure sufficient to eject the liquid without disrupting the container, a time fuse for igniting the substance, a primer for igniting the fuse, and a nipple supporting the primer.

7. A hand-grenade to receive a liquid and containing a gaseous substance adapted upon ignition to generate a gas pressure sufficient to eject the liquid without disrupting the container, a time fuse for igniting the substance, a primer for igniting the fuse, a nipple for supporting the primer, a hammer for imparting a concussion to the primer, and means for normally holding the hammer from concussion contact with the primer.

8. A hand-grenade to receive a liquid and containing a gaseous substance adapted upon ignition to generate a gas pressure sufficient to eject the liquid without disrupting the container, a tubular member supported from a part of the container, a time fuse fitting in said tubular member, a cartridge at the lower end of the fuse containing a gas producing compound ignitable from the fuse, a primer adjacent the fuse for ignition of the fuse, and a concussion-hammer positioned to act on the primer.

9. A hand-grenade comprising a container for a liquid, a removable cap to the container, a tubular member supported from the cap and extending into the container, a fuse fitting in the tubular member, a cartridge at the lower end of the fuse and containing a gas producing compound ignitable from the fuse, a primer at one end of the fuse for ignition of the fuse, means for acting on the primer to effect ignition of the fuse, a member for imparting a concussion blow on the primer, and a nozzle through which the contents of the container are ejected by gas generated in the container from the gas producing compound.

10. A hand-grenade, comprising a container for a liquid, a fuse and ignitable gaseous substance for creating a pressure within the container to expel its contents, a delivery nozzle for the contents of the container, and self-contained means for causing an oscillatory movement of the container while its contents are being ejected.

In testimony whereof I affix my signature.

GEORGE S. MAXWELL.